Oct. 30, 1923.
W. D. DEWEND
1,472,209
AGRICULTURAL IMPLEMENT
Filed April 19, 1922
3 Sheets-Sheet 2
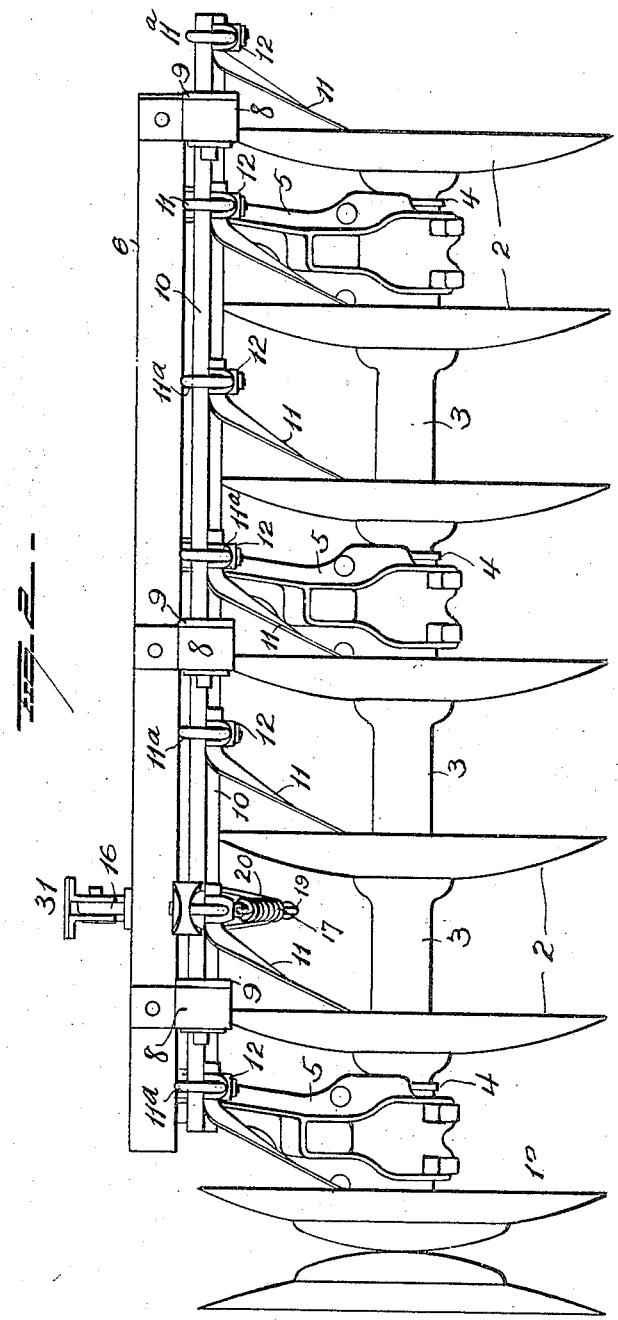
Inventor
W. D. Dewend
By Seymour & Bright
Attorney

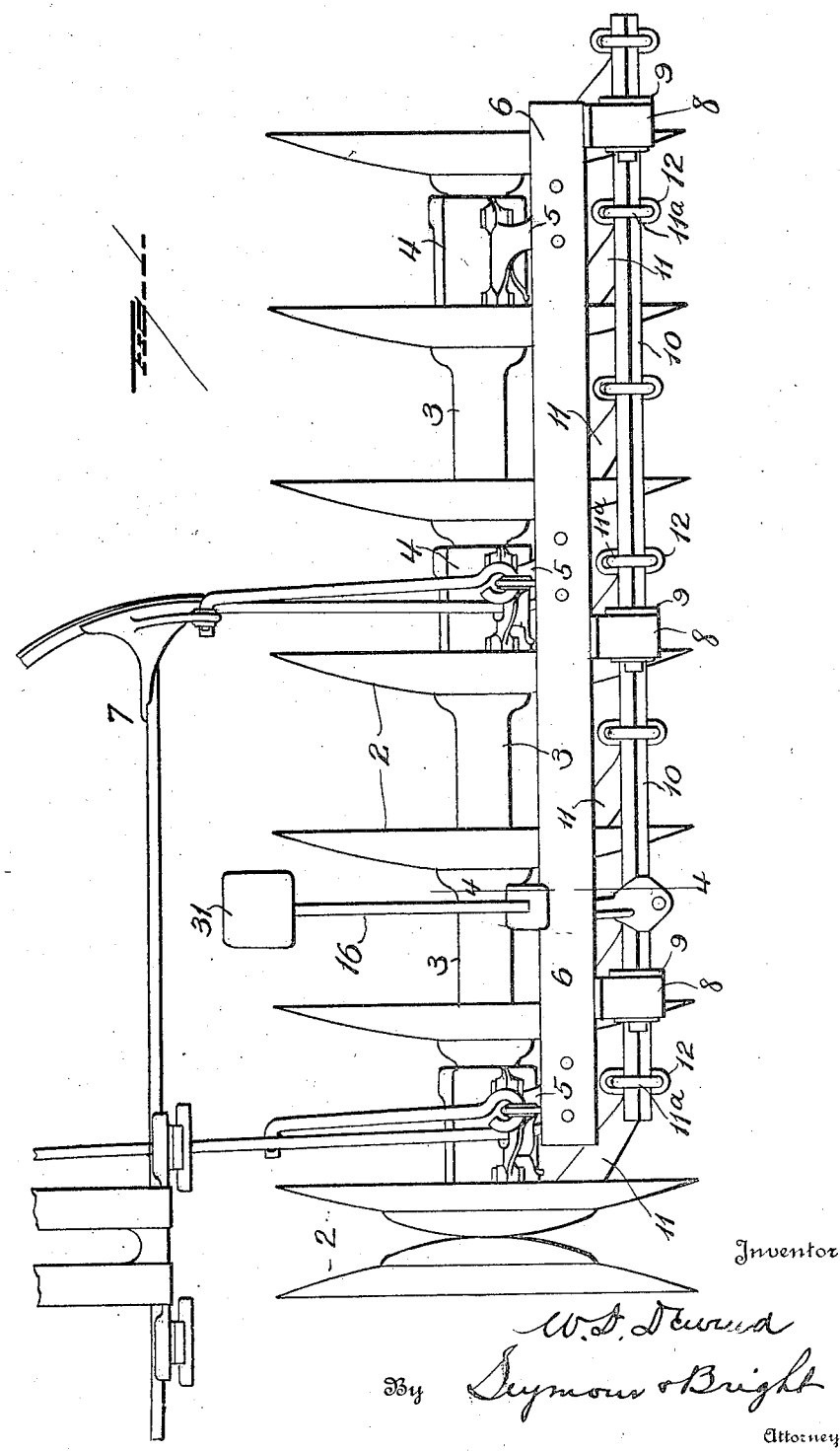

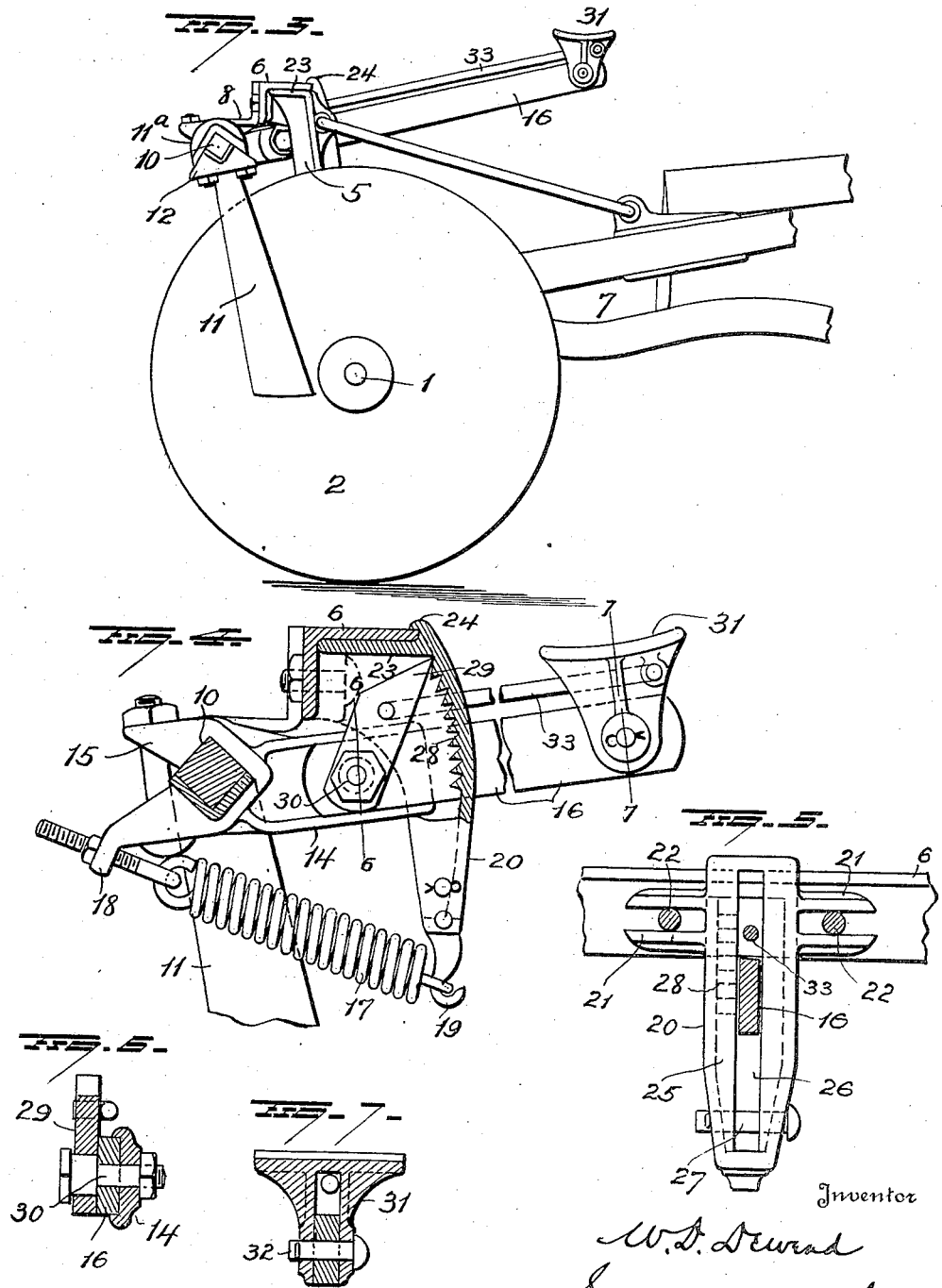

Patented Oct. 30, 1923.

1,472,209

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

AGRICULTURAL IMPLEMENT.

Application filed April 19, 1922. Serial No. 555,546.

*To all whom it may concern:*

Be it known that I, WILLIAM D. DEWEND, a citizen of the United States, and a resident of South Bend, in the county of St. Joseph and State of Indiana, have invented certain new and useful Improvements in Agricultural Implements; and I do hereby declare the following to be a full, clear, and exact description of the invention, such as will enable others skilled in the art to which it appertains to make and use the same.

This invention relates to improvements in agricultural implements of the disk type and more particularly to means for regulating and controlling the scrapers for disk blades of such implements as disk harrows, one object of the invention being to provide simple and efficient means whereby the operator may readily shift and control the positions of the scrapers for a plurality of disks simultaneously.

A further object is to so construct the controlling mechanism that adjustment of a plurality of scrapers with respect to the pressure of the same against the disk blades may be effected simultaneously.

With these and other objects in view, the invention consists in certain novel features of construction and combinations of parts as hereinafter set forth and pointed out in the claims.

In the accompanying drawings: Figure 1 is a plan view of a portion of a disk harrow showing an embodiment of my invention; Figure 2 is a rear view of the same; Figure 3 is a side view; Figure 4 is an enlarged sectional view on the line 4—4 of Figure 1; Figure 5 is a front view showing the arm or bracket 20; Figure 6 is a sectional view on the line 6—6 of Figure 4, and Figure 7 is a sectional view on the line 7—7 of Figure 4.

In Figures 1 and 2 of the drawings, I have shown a portion of a disk harrow of that type in which two disk gangs disposed end to end are employed and I have shown the application of my improvements to one of said gangs. It will be understood that my improvements are equally well applicable to any agricultural implement of the disk type in which a single disk gang or a plurality of disk gangs may be employed, and that in the latter case, the scraper controlling and adjusting mechanism may be duplicated for each gang.

The disk harrow or a gang unit thereof may comprise a shaft 1 on which earth working members made in the form of disk blades 2 are mounted and suitably spaced apart by sleeves or spools 3 and 4, the latter being flanged and adapted to have the lower end portions of standards 5 secured to them. A horizontal angle beam 6 is secured to the upper ends of the standards 5 and extends approximately from end to end of the harrow or gang unit. The standards 5 and beam 6 thus constitute a harrow or gang unit frame and to such frame, a suitable draft frame, such as indicated at 7, is connected.

Brackets 8 are secured to the angle beam 6 and project rearwardly therefrom, said brackets having bushings 9 mounted therein to provide bearings for a scraper shaft 10, preferably angular in cross section, and to this shaft, scrapers 11 are rigidly secured by means of clamping blocks 12 and U-bolts 11ª, and adapted to engage the concave faces of the disks 2 as will be readily understood.

A flanged arm 14 is rigidly secured to the scraper shaft 10, through the medium of a clamp 15 preferably made as an integral part of said arm. The arm 14 receives and, in effect, constitutes a part of a foot lever 16 for turning the shaft 10 in one direction to cause the scrapers 11 to move over the concave faces of the disks in a direction toward the peripheral portions of the latter. Movements of the scrapers in the opposite direction, viz. toward the axial portions of the disks,—is effected (when the front lever moves upwardly) by the action of a spring 17, one end of which is adjustably connected with an arm 18 of the clamp 15 and the other end of said spring is connected with a hook 19 at the lower end of a guide bracket 20.

The guide bracket 20 may be made in the form of a hollow casting and is provided near its upper end with slotted arms or ears 21 for the passage of bolts 22, by means of which the bracket is adjustably secured to the vertical member of the angle beam 6, and said bracket may also be made with a top member 23 to underlie the horizontal member of the beam 6 and with a flange or lip 24 to overlie the front edge portion of the horizontal beam member. The front portion of the guide bracket 20 is curved and provided with a vertical elongated slot 26 through which the scraper control lever 16 passes and a pin 27 passing across said slot near the lower end portion of the bracket serves as a stop to limit the downward movement of the control lever 16 and to prevent the scrapers from being moved beyond the peripheries of the disk blades. At one side of the slot 26, the portion 25 of the guide bracket is provided on its rear face with teeth forming a segmental ratchet bar 28 to be engaged by a pawl 29 carried by the foot lever 16,—said pawl being pivotally mounted on a shoulder-bolt 30,—which latter also serves as securing means for the main portion 16 of said foot lever to the arm member 14, as shown in Figure 6.

A pedal lever 31 is located near the free end of the foot lever 16 and is bifurcated as illustrated in Figure 7 to straddle said foot lever, to which latter it is connected by a pin 32. The pedal lever 31 is connected with the pawl 29 through the medium of a rod 33 whereby said pawl may be operated relatively to the ratchet bar 28, by means of the pedal lever.

With the construction and arrangements of parts above described, downward pressure exerted upon the front edge of the pedal lever 31 tends to force the foot lever 16 downwardly, thereby causing the scrapers 11 to swing or oscillate toward the outer or peripheral edges of the disk blades 2, and the same movement of said pedal lever operates to force the pawl 29 into engagement with the teeth of the ratchet bar 28 so that during the downward movement of the foot lever, said dog will be caused to move over teeth of the ratchet bar 29 and may be permitted to become locked at any desired part of the latter by simply removing pressure from the foot lever, the spring 17 exerting a force tending to move the foot lever upwardly and thus causing the pawl to remain in engagement with the ratchet bar and the scrapers to be held locked in the positions to which they may have moved by depression of the foot lever. Pressure upon the rear edge of the pedal 31 will cause the same to rock in a direction to transmit motion, through the rod 33, to the pawl for releasing the same from the ratchet bar and thus permit the scrapers to move toward the centers of the disks 2.

By loosening the nuts on the bolts 22, the bracket 20 may be adjusted laterally, and such adjustment may be effected by lateral pressure applied to the control lever 16. When the control lever is thus moved laterally, slight longitudinal movement will be imparted to the scraper shaft 10 and hence the scrapers carried by said shaft will tend to move toward or from the disks. In this way, the degrees of pressure of the scrapers against the disks may be readily adjusted.

It will be observed that both the sweep of the scrapers and the degree of pressure of the same against the disks, may be accurately and conveniently controlled by manipulation of a single control lever,—it being simply necessary in the case of the pressure adjustment, to loosen the nuts on the bolts which hold the guide bracket 20 to permit movement of said bracket when the control lever is pressed laterally.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In an agricultural implement, the combination with a soil engaging disk and means for mounting the same, of a scraper for the disk, an oscillatory lever, means connecting said lever with said scraper whereby the scraper may be moved radially over a face of said disk, means whereby said lever may be adjusted laterally to adjust the pressure of the scraper against the disk and means for securing the adjusting means at any desired adjustment.

2. In an agricultural implement, the combination with a soil-engaging disk and means for mounting the same, of a scraper for the disk, an oscillatory lever, means connecting said lever with said scraper whereby said scraper may be moved radially over a face of the disk, means for locking said lever at any desired radial adjustment of the scraper, and means whereby said lever may be moved laterally to adjust the pressure of the scraper against the disk and hold said lever at any desired position of lateral adjustment.

3. In an agricultural implement, the combination with a frame and a disk gang, of a shaft mounted on said frame, scrapers for the disks of the gang, secured to said shaft, a lever secured to said shaft, a ratchet bar secured to the frame, a pawl carried by said lever to engage said ratchet bar, and a pedal mounted on said lever and connected with said pawl.

4. In an agricultural implement, the combination with a frame and a disk gang, of a shaft mounted on the frame, scrapers for the disks of the gang, secured to said shaft, a foot lever secured to said shaft, a bracket having an elongated slot through which said foot lever passes, and means for securing said bracket to the frame and permitting lateral adjustment of said lever to adjust the pressure of the scrapers relatively to the disks of the gang.

5. In an agricultural implement, the combination with a frame and a soil-engaging disk, of an oscillatory lever having a mounting on the frame, a disk scraper operatively connected with said lever, a bracket having an elongated slot through which said lever passes, and means adjustably securing said bracket to the frame, whereby said bracket and lever may be adjusted laterally to adjust the pressure of the scraper against the disk.

6. In an agricultural implement, the combination with a frame and a soil-engaging disk, of an oscillatory lever mounted on the frame, a disk scraper operatively connected with said lever, a bracket secured to said frame and having an elongated slot through which said lever passes, said bracket provided at one side of said slot with a ratchet bar, a pawl carried by said lever to engage said ratchet bar, a second lever mounted on said first mentioned lever and connected with said pawl, and a spring connected with said first-mentioned lever and bracket and tending normally to force the long arm of the same upwardly.

7. In an agricultural implement, the combination with a frame, a disk gang, a shaft mounted on said frame, and disk scrapers secured to said shaft, of a foot lever secured to said shaft for oscillating the same, a guide bracket secured to the frame and having an elongated slot through which said foot lever passes, said bracket provided with a ratchet bar, a pawl carried by the foot lever to engage said ratchet bar, a spring attached at one end to said bracket and at the other end with the foot lever and tending normally to force the long arm of said lever upwardly, a pedal lever mounted on the foot lever, and a rod connecting said pedal lever with said pawl.

8. In an agricultural implement, the combination with an angle-iron frame beam, standards depending therefrom, a shaft mounted at the lower ends of said standards, and soil-engaging disks mounted on said shaft, of brackets secured to and projecting rearwardly from said beam, a shaft, mountings for said shaft in said brackets, disk scrapers secured to said shaft, a guide bracket having arms secured to the vertical member of said beam and a part engaging the horizontal member of said beam, said guide bracket having a vertical slot and a ratchet bar at one side of said slot, a foot lever secured to said shaft and passing forwardly through the vertical slot of said guide bracket, an arm projecting rearwardly from said shaft, a spring connected at one end with said arm and at the other end with said guide bracket, a pawl carried by the foot lever to engage the ratchet bar of the guide bracket, a pedal lever mounted on the foot lever, and a rod connecting said pedal lever with said pawl.

In testimony whereof, I have signed this specification in the presence of two subscribing witnesses.

WILLIAM D. DEWEND.

Witnesses:
 JENNIE M. DAVIS,
 CHAS. A. WEBSTER.